(12) United States Patent
Okabe

(10) Patent No.: US 7,460,338 B2
(45) Date of Patent: Dec. 2, 2008

(54) WIRING COMPONENT AND MAGNETIC RECORDING DRIVE FOR HIGH DATA-RATE RECORDING

(75) Inventor: Hiroshi Okabe, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 384 days.

(21) Appl. No.: 11/341,240

(22) Filed: Jan. 26, 2006

(65) Prior Publication Data

US 2006/0164761 A1 Jul. 27, 2006

(30) Foreign Application Priority Data

Jan. 26, 2005 (JP) ............... 2005-017830

(51) Int. Cl.
*G11B 5/48* (2006.01)
(52) U.S. Cl. .................................. 360/245.9
(58) Field of Classification Search ........... 360/245.8, 360/245.9, 245, 244.2, 244.9, 294.4; 29/603.03, 29/603.06
See application file for complete search history.

(56) References Cited

U.S. PATENT DOCUMENTS

| | | | |
|---|---|---|---|
| 5,995,328 A * | 11/1999 | Balakrishnan | 360/245.9 |
| 6,351,351 B1 | 2/2002 | Takasugi | |
| 6,404,594 B1 * | 6/2002 | Maruyama et al. | 360/245.8 |
| 6,424,500 B1 * | 7/2002 | Coon et al. | 360/245.9 |
| 6,714,385 B1 * | 3/2004 | Even et al. | 360/246 |
| 6,894,874 B2 * | 5/2005 | Maruyama et al. | 360/245.9 |
| 6,900,967 B1 * | 5/2005 | Coon et al. | 360/245.9 |
| 6,963,471 B2 * | 11/2005 | Arai et al. | 360/246 |
| 7,016,156 B2 * | 3/2006 | Maruyama et al. | 360/245.8 |
| 7,082,004 B2 * | 7/2006 | Kajiyama et al. | 360/46 |
| 2003/0193753 A1 | 10/2003 | Arai et al. | |
| 2005/0180041 A1 * | 8/2005 | Kajiyama et al. | 360/67 |
| 2007/0109064 A1 * | 5/2007 | Micko | 331/158 |

FOREIGN PATENT DOCUMENTS

| | | |
|---|---|---|
| JP | 2000-057549 | 2/2000 |
| JP | 2001-202601 | 7/2001 |

OTHER PUBLICATIONS

J.C. Jury et al., "Designing Disk Drive Interconnects to Obtain a Desired Transmitted Write Current Waveform", IEEE Transactions on Magnetics, vol. 38, No. 1, Jan. 2002.
K.B. Klassen et al., "Read/Write Electronics Front-End Systems for Hard Disk Drives", IEEE Transactions on Magnetics, vol. 40, No. 1, Jan. 2004.

* cited by examiner

*Primary Examiner*—Allen T Cao
(74) *Attorney, Agent, or Firm*—Townsend and Townsend and Crew LLP; Darren Gold

(57) ABSTRACT

Embodiments of the invention enable high-speed data recording on a magnetic recording medium. In one embodiment, a first section is provided at the recording and reproducing circuit IC side of the inter-connect substrate while a second section is provided at the head side and a third section is provided between a position closer to the head than a section crossed by a spring part of the suspension and the head. Then, the characteristic impedance of the third section recording line is set lower than that of the recording line in the second section except for the first and third sections and the wiring distance between the recording line and the reproducing line in the third section is set longer than that between the recording line and the reproducing line in each of the first and second sections. In addition, the output resistance of the recording and reproducing circuit IC is equated with the characteristic impedance of the main FPC recording line.

18 Claims, 9 Drawing Sheets

WIRING COMPONENT AND MAGNETIC RECORDING DRIVE FOR HIGH DATA-RATE RECORDING

CROSS-REFERENCES TO RELATED APPLICATIONS

This application claims priority from Japanese Patent Application No. JP2005-017830, filed Jan. 26, 2005, the entire disclosure of which is incorporated herein by reference.

BACKGROUND OF THE INVENTION

The present invention relates to a transmission system provided between a recording and reproducing circuit and a head element in a magnetic recording drive and more particularly to a wiring component preferred to record high-speed data signals and a magnetic recording drive that uses the same.

The patent document 1 (Official gazette of JP-A No.57549/2000) discloses a method for lowering the inductance to shorten the rise time of a high-speed signal current waveform in a magnetic disk drive by forming both of an inter-connect substrate recording line and an inter-connect substrate reproducing line wider partially at all regions except around the head element. And, the patent document 2 (Official gazette of JP-A No.202601/2001) discloses a method for shortening both of the recording current rise time and the current stabilization time using return currents generated between the recording head and the inter-connect substrate recording line, and between the recording signal output terminal of the recording and reproducing circuit IC and the inter-connect substrate recording line in a magnetic recording drive. On the other hand, the patent document 3 (Official gazette of JP-A No.308668/2003) discloses a wiring component designed to reduce the crosstalk and improve the mechanical strength in a suspension for a disk drive by changing the thickness of the insulation layer provided under a wiring laid up to the magnetic head. Furthermore, the non-patent document 1 Jason C. Jury and one person, "Designing Disk Drive Interconnects to Obtain a Desired Transmitted Write Current Waveform" (USA, IEEE Transaction on Magnetics) Jun. 2002, Vol. 38, No. 1, pp. 55-60) discloses a method employed in a disk drive. The method obtains a desired current waveform by dividing an inter-connect substrate recording line equally into plural sections, thereby optimizing the characteristic impedance in each section.

BRIEF SUMMARY OF THE INVENTION

Hereunder, a description will be made for a general configuration of a magnetic recording drive, as well as how to record/reproduce data in/from the same with reference to FIG. 1. In a recording process, a signal to be recorded, which is generated by a signal processor LSI (Large Scale Integration)(not shown) mounted on a recording and reproducing control substrate (not shown) attached to an external wall of a body 9 is inputted to the body 9 through a connector 7 and the signal reaches a recording and reproducing circuit IC (Integrated Circuit) 3 through a transmission line provided on a main flexible printed circuit (hereinafter, to be referred to as a main FPC) 4 having one end connected to an arm 6. The signal waveform is shaped by the recording and reproducing circuit IC, then output from a record signal output terminal, then transferred to a recording head of a head element 2 mounted on a suspension 5 fixed to the tip of the arm 6 through a main FPC recording line provided on the main FPC and through an inter-connect substrate recording line provided on an inter-connect substrate 1 connected to the main FPC recording line, then transformed to a magnetic field by the recording head such as a thin film inductor, whereby it is recorded on a magnetic disk 8.

In a reproducing process, data recorded on the magnetic disk 8 appears as a resistance change of a reproducing head such as a giant magneto resistive head provided at the head element 2. This resistance change is converted to a voltage change signal, which is then transferred to the recording and reproducing circuit IC 3 through an inter-connect substrate reproducing line provided on the inter-connect substrate 1 and a main FPC reproducing line provided on the main FPC 4. The recording and reproducing circuit IC 3 amplifies the received signal and transmits the amplified signal to the signal processor LSI through the transmission line provided on the main FPC 4 and the connector 7. The signal processor LSI generates a signal to be reproduced from the signal inputted.

The magnetic disk drive described above has been demanded to be further improved for both larger capacity and faster recording/reproducing performance. In order to enable such faster recording in the magnetic disk drive, however, a signal current that rises quickly is required to be transmitted to the recording head by keeping the waveform and the following three points come up as problems. The first problem is degradation of the rise time, the second problem is degradation of the amplitude, and the third problem is degradation of the waveform to be caused by ringing. The first and second problems are mainly caused by a transmission loss in the object transmission system and the third problem is caused by a multiple reflection to be caused by impedance mismatching to occur among the parts of the transmission system. Those problems are common not only to magnetic disks, but also to most of such magnetic recording media as magnetic tape, etc.

The method disclosed in the patent document 1 takes no consideration to the characteristic impedance of each section of the inter-connect substrate recording line, so that the method cannot avoid ringing to be generated in recording signals due to the multiple reflection to occur in each section of the inter-connect substrate recording line. The method is thus almost disabled for accurate data recording.

The method disclosed in the patent document 2 determines an overshooting width according to a time of signal transmission between the recording head and the recording and reproducing circuit IC, so that the method is almost disabled to meet the requirement of high-speed date rate signals.

The method disclosed in the patent document 3 is mainly intended to reduce the crosstalk and does not take into consideration signal waveforms, so that the method is unavoidably disabled to do desired recording when in high-speed recording operations.

The method disclosed in the non-patent document 1 divides an inter-connect substrate recording line into many sections and generates a desired recording waveform to realize desired impedance in each section of the recording line. The method thus comes to make the inter-connect substrate recording-line complicated in design unavoidably.

In addition, none of the above methods takes into consideration the following problems to arise actually from the magnetic disk drive; one of the problem is that the inter-connect substrate flutters due to the airflow or wind generated by the rotation of the magnetic disk in the magnetic disk drive, thereby the height of the head element with respect to the surface of the magnetic disk varies and another problem is that the spring property of the suspension is degraded if the flexibility of the inter-connect substrate is degraded.

Furthermore, none of the methods described above takes into consideration the main FPC recording line for connecting the recording and reproducing circuit IC to the recording line provided on the inter-connect substrate. Conventionally, it has been impossible to reduce the main FPC substrate in thickness to keep the strength and this is why the characteristic impedance $Z_0$ of the main FPC recording line cannot be lowered. As a result, the relationship between the output resistance $R_s$ of the record signal output terminal and the characteristic impedance $Z_1$ of the inter-connect substrate recording line has been left at $Z_0 > R_s = Z_1$. Even in the relationship with this impedance, a multiple reflection occurs at both sides of the main FPC recording line if the transmission rate is high, that is, if the rise time is short, whereby the signal waveform is degraded while such a problem does not occur if the main FPC recording line is short enough with respect to the signal rise time. This has been a problem.

Under such circumstances, it is a feature of the present invention to provide a wiring component enabled to generate overshooting required for high-speed data recording and enable high-speed data recording on a magnetic recording medium with simple design modification of the inter-connect substrate recording line, as well as to provide a magnetic disk drive that uses the same.

The above feature of the present invention is achieved effectively by a wiring component that includes a head element for recording/reproducing data on/from a recording medium, a recording and reproducing circuit for supplying a signal to be recorded to the head element and amplifying a signal to be reproduced by the head element, a first line provided at the recording and reproducing circuit side and used to connect the recording and reproducing circuit to the head element, and a second line provided at the head element side and used to connect the recording and reproducing circuit to the head element. A first recording line of the second line, which transmits the signal to be recorded, is divided into a first section for the recording and reproducing circuit side and a second section for the head element side while the second section has a portion of the first recording line, which has characteristic impedance that is lower than that of the first recording line of the first section and another portion of the first recording line, which has characteristic impedance matching that of the first recording line of the first section. If such a technique is employed, it becomes possible to fix the substrate of the second section provided at the head element side to the suspension on which the head element is to be mounted when the second line is formed on the substrate, as well as to lower the characteristic impedance by increasing the line in width. Consequently, overshooting required for high-speed data recording can be generated only with a simple modification of the design of the second line, thereby realizing high-speed data recording on a magnetic recording medium.

According to the present invention, because overshooting required for high-speed data recording can be generated as described above, it can be expected to realize a wiring component capable of high-speed data recording on a magnetic recording medium or a magnetic recording drive that uses the same.

DETAILED DESCRIPTION OF THE INVENTION

Figure 1:
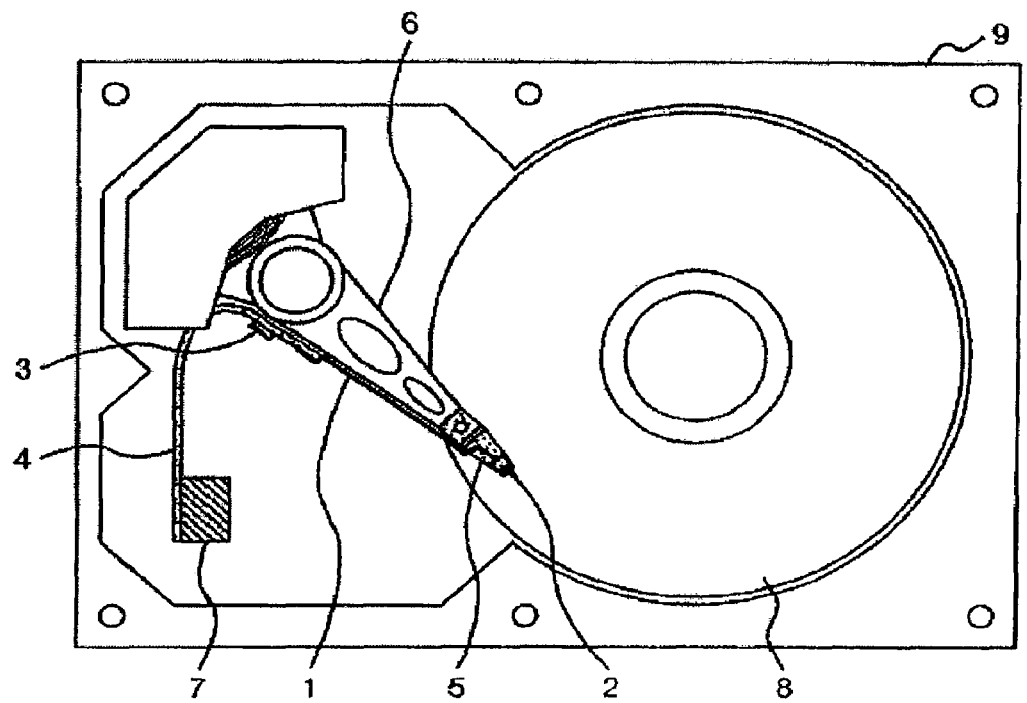
FIG. 1 is a diagram of a general magnetic disk drive.

Hereunder, a wiring component of the present invention and a magnetic recording drive that uses the same will be described in detail with reference to the embodiments shown in the accompanying drawings. In those drawings of the embodiments, the same reference numerals/symbols will be used for all the same functional items to avoid redundant description.

First Embodiment

Figure 2A:
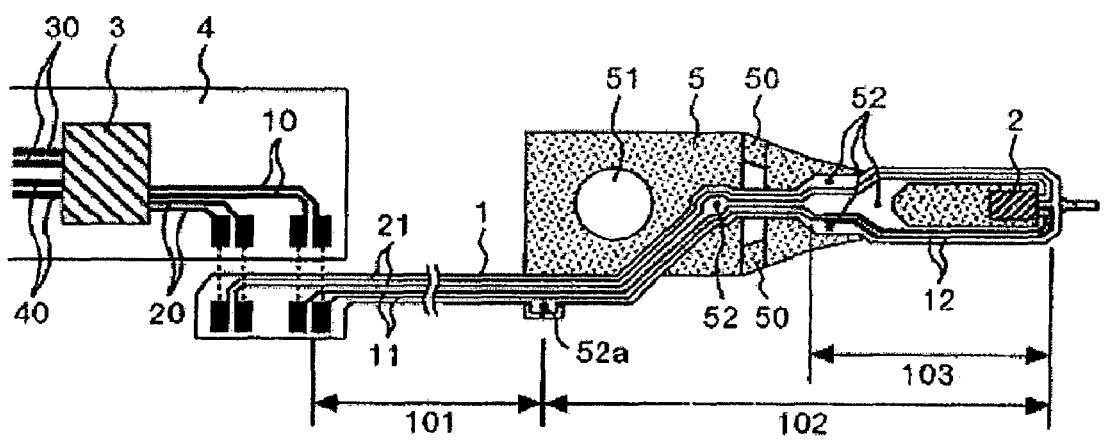
FIG. 2A is a diagram of a wiring component in the first embodiment of the present invention.

FIG. 2A shows the first embodiment of the wiring component of the present invention. A recording and reproducing circuit IC 3 is mounted on a main FPC 4 and the main FPC 4 is fixed to an arm 6 (FIG. 1) around the place where the recording and reproducing circuit IC 3 is to be mounted. Signals to be recorded/reproduced are exchanged between the recording/reproducing IC 3 and a signal processor LSI (to be described later) through a recording line 30 provided between the recording/reproducing IC 3 provided on the main FPC 4 and the signal processor LSI and through a reproducing line 40 provided between the recording/reproducing IC 3 and the signal processor LSI.

An inter-connect substrate recording line (first recording line) 11 is provided in the first section 101 between an end of the inter-connect substrate 1, which is the closest to the recording/reproducing IC 3, and a fixing position 52a closest to the recording/reproducing IC 3 among plural positions at which the inter-connect substrate 1 is fixed to the suspension 5. The inter-connect substrate recording line 11 is extended up to a position close to the head element 2 from a spring part 50 in the second section 102 between the fixing position 52a and an end of the suspension 5, which is located at the head element 2 side and an inter-connect substrate recording line (first recording line) 12 is provided between the position and the head element 2. The inter-connect substrate recording line 11 crosses the spring part 50 almost in the center thereof. A section of the second section 102, where the inter-connect substrate recording line 12 is provided, is the third section 103.

The inter-connect substrate recording line 11 is 31 mm in length while the inter-connect substrate recording line 12 is 5 mm in length. The effective permittivity of each of the inter-connect substrate recording lines was about 2. An inter-connect substrate reproducing line 21 is also provided on the inter-connect substrate 1. Those inter-connect substrate recording lines and the inter-connect substrate reproducing line to be used as the second lines respectively are all differential lines, thus each of the lines is constituted of a pair of wirings.

The characteristic impedance $Z_2$ of the inter-connect substrate recording line 12 is 30Ω while the characteristic impedance $Z_1$ of the inter-connect substrate recording line 11 is 100Ω. The inter-connect substrate recording line 12 is set wider in width than the inter-connect substrate recording line 11 to make the characteristic impedance $Z_2$ lower than the characteristic impedance $Z_1$.

The wiring distance between the inter-connect substrate recording line 12 and the inter-connect substrate reproducing line 21 is over 0.5 mm when the portion for connecting the head element 2 to those wirings is excluded. The wiring distance between the inter-connect substrate recording line 11 and the inter-connect substrate reproducing line 21 is 0.3 mm.

In this first embodiment, the inter-connect substrate 1 is configured as follows in cross sectional view; the entire back face assumed to be a ground conductor is made of copper, which is covered by a dielectric layer made of polyimide, and a copper wiring is formed thereon. The copper wiring is covered by a cover coat. The ground conductor may be made of stainless steel or the like. The ground conductor may be removed partially if the inter-connect substrate is required to be flexible. Even when the ground conductor is removed partially in such a way, almost no problem will arise from the transmission characteristic, since both of the inter-connect substrate recording line 11 and the inter-connect substrate reproducing line 21 are differential lines. If a ground conductor is provided all over the back face of the inter-connect substrate 1 just like in this first embodiment, the electric field between wirings of the differential line becomes concentrated between each wiring and the grounding conductor, so that the coupling capacitance to another differential line is reduced, whereby the crosstalk is reduced effectively.

The recording signal current output from the recording/reproducing IC 3 is transferred to the recording head of the head element 2 through the main FPC recording line 10 (second recording line), as well as through both of the inter-connect substrate recording line 11 and the inter-connect substrate recording line 12 connected to the main FPC recording line 10, respectively. The recording signal output resistance $R_s$ of the recording/reproducing IC 3 is 100Ω and the character impedance $Z_0$ of the main FPC recording line 10 is 100Ω and the line is 10 mm in length. The equivalent impedance $Z_h$ of the recording head is represented by the serial connection between the resistor $R_h$ and the inductor $L_h$. In this first embodiment, $R_h$=4Ω and $L_h$=5nH are assumed.

The data received by the head element 2 is transferred to the recording/reproducing IC 3 through the inter-connect substrate reproducing line 21, as well as through the main FPC reproducing line 20 connected to the inter-connect substrate reproducing line 21.

The inter-connect substrate 1 used for the connection to the head element 2 is fixed to the suspension 5 at plural inter-connect substrate—suspension fixing positions.

In this first embodiment, the wiring component is configured by the recording/reproducing IC 3, the main FPC 4, the inter-connect substrate 1 and the head element 2. The head element 2, the inter-connect substrate 1, and the suspension 5 are assembled into a head gimbal assembly (hereinafter, to be described as the "HGA"). The HGA is fixed to the arm 6 (see FIG. 1) at an arm fixing hole 51 provided at the suspension 5. In the wiring component, a transmission system for recording is formed between the recording/reproducing IC 3 for outputting the recording signal current and each of the main FPC recording line 10, the inter-connect substrate recording line 11, the inter-connect substrate recording line 12, and the head element 2.

Figure 2B:
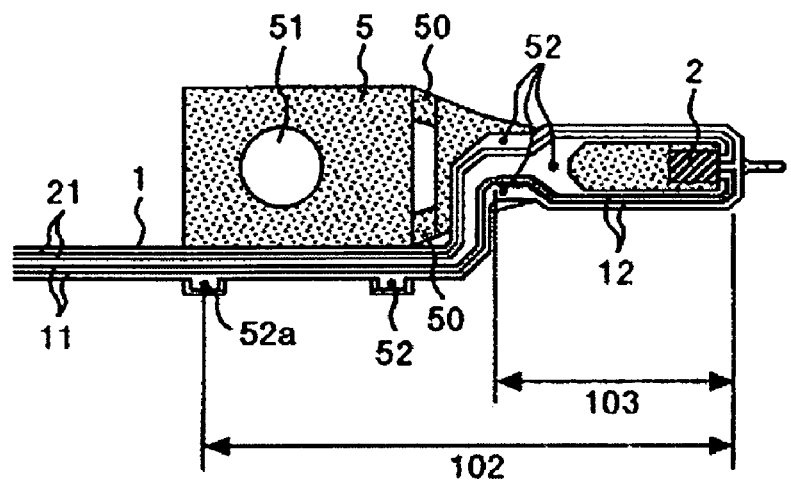
FIG. 2B is another diagram of the wiring component in the first embodiment of the present invention.

Although it is described above that the inter-connect substrate recording line 11 crosses the spring part 50 almost in the center, the inter-connect substrate recording line 11 may also be disposed in parallel to the spring part 50 as shown in FIG. 2B.

The above configuration of the wiring component is based on the following principle. At first, the transmission loss of the transmission line becomes a value that cannot be ignored because of conductor loss and additional surface resistance in a high frequency band. Consequently, the waveform of the signal output from the recording and reproducing circuit IC is attenuated significantly before the signal reaches the head; the more the data of which signal rises quickly, the more the waveform is degraded. Particularly, an overshooting portion consisting of higher frequency components among a signal waveform is affected by the transmission loss more remarkably. Although the degradation of the overshooting waveform can be compensated by an increase of the output of the recording and reproducing circuit IC, the increase of the output comes to cause both power consumption and heat generation to be increased.

Generally, if a current flows into a low characteristic impedance line from a high characteristic impedance line, a current reflection occurs due to the mismatching of impedance, whereby a reversed polarity return current and a larger amplitude transmission current are generated. If a current flows into a high characteristic impedance line from a low characteristic impedance line, the same polarity return current and a smaller amplitude transmission current are generated. The present invention makes good use of this phenomenon, as well as the multiple reflection phenomenon to realize a peak current waveform for compensating the degraded overshooting waveform.

If the characteristic impedance of the inter-connect substrate recording line 12 in the third section 103 is set lower than those of the inter-connect substrate recording line 11 in the second and first sections 102 and 101 except for the third section 103, the amplitude of the recording signal current generated by the recording/reproducing IC 3 increases due to the current return between the third section 103 and another section, that is, the second section 102. Then, because the recording head is an inductor having small resistance components, the amplitude of the recording signal current further increases due to the return current between the third section 103 and the recording head and flows into the recording head.

At the same time, the current returned from the recording head has a polarity opposite to that of the current flowing into the recording head. If such a current flows to the first section 101, the current is returned between the third section 103 and another section, that is, the second section 102, whereby the current having the same polarity, that is, a reversed polarity flows to the recording head as a re-return current. The larger amplitude recording signal current flowing into the recording head first and the re-return current having a reversed polarity and flowing into the recording head after the first one are combined to form a peak current waveform with a narrow width.

Both height and width of an overshooting waveform are just required to be enough to make the recording head generate a magnetic field waveform that rises quickly. If the height is too high, the reproducing head might be damaged seriously by crosstalk. If the width is too wide, the next bit data waveform in a high-speed data signal is affected badly by the width. Both height and width of a peak current waveform for compensating a degraded overshooting waveform can be controlled by both characteristic impedance and length of the third section 103; the lower the characteristic impedance is, the more the height increases and the shorter the length is, the more the width decreases. However, the more the length of the third section 103 is reduced, the more the peak current waveform height is decreased. When obtaining the same height overshooting, therefore, the characteristic impedance is required to be lowered more. Because the shape of the peak current waveform is also related to both equivalent inductance and resistance of the recording head, the equivalent circuit analysis to be performed with a circuit simulator would be proper to obtain such a desired shape.

According to the present invention, the overshooting waveform degraded by a transmission loss between the recording/reproducing IC 3 and the recording head is compensated by the principle described above. In addition, because the wiring distance between the inter-connect substrate recording line 12 and the inter-connect substrate reproducing line 21 in the third section 103 is set longer than that between the inter-connect substrate recording line 11 and the inter-connect substrate reproducing line 21 in the first section 101, it is also possible to reduce the crosstalk to be transferred from the recording system to the reproducing system even while the overshooting waveform is compensated as described above.

According to the present invention, in order to form a peak current waveform, the characteristic impedance in the third section 103 of the inter-connect substrate recording line is set low to cause a multiple reflection in the third section 103. Thus, a large multiple reflection current is generated in the inter-connect substrate recording line in the third section 103. If the current flows into the reproducing head through the inter-connect substrate reproducing line 21, the current causes the reproducing head to be damaged.

In view of the foregoing, the wiring distance between the inter-connect substrate recording line 12 and the inter-connect substrate reproducing line 21 in the third section 103 is set longer than that between the inter-connect substrate recording line 11 and the inter-connect substrate reproducing line 21 in the first section, thereby reducing the crosstalk in a place where a large multiple reflection current exists in the inter-connect substrate recording line. The current coupling, that is crosstalk, can thus be prevented from the inter-connect substrate recording line 12 to the inter-connect substrate reproducing line 21 effectively without changing the wiring in any other places.

When causing the characteristic impedance of the inter-connect substrate recording line 12 in the third section 103 to be lower than that of the inter-connect substrate recording line 11 in both of the second section 102 and the first section 101, it is effective to set the inter-connect substrate recording line 21 12 in the third section wider in width than the inter-connect substrate recording line 11 in both of the second section 102 and the first section 101. Because the inter-connect substrate recording line 12 is printed on the inter-connect substrate 1, the line can be formed with low characteristic impedance simply by increasing the width.

Furthermore, the wiring distance between the inter-connect substrate recording line 12 and the inter-connect substrate reproducing line 21 in the third section 103 is set longer than that between inter-connect substrate recording line 11 and the inter-connect substrate reproducing line 21 in the first section 101. Consequently, the crosstalk between wirings in each of those sections is prevented from increasing even when the wiring is widened more.

If the third section 103 is provided in the second section 102 in which the inter-connect substrate 1 is fixed to the suspension 5 (between the fixing position 52a closest to the recording/reproducing IC 3 among the plurality of fixing positions for fixing the inter-connect substrate 1 and the head element 2), the degradation of the above overshooting waveform is compensated. At the same time, the following problem can be avoided; the inter-connect substrate 1 is disturbed by the wind generated by the rotation of the magnetic disk 8 in the magnetic disk drive body 9, thereby the height of the head element is varied with respect to the surface of the magnetic disk 8. The reason will be described below.

An edge of the inter-connect substrate 1, which is the closest to the recording/reproducing IC 3, is fixed to the arm 6 through the main FPC 4 when the inter-connect substrate recording line 11 and the inter-connect substrate reproducing line 21 are connected to the main FPC recording line 10 and the main FPC reproducing line 20 respectively. A portion of the inter-connect substrate 1, which is between the fixing position 52a and the head element 2, is fixed to the arm 6 through the suspension 5. Consequently, a portion of the inter-connect substrate 1 between the edge of the inter-connect substrate 1, which is the closest to the recording/reproducing IC 3, and the fixing position 52a is not fixed to any place, so that the portion comes to be disturbed by winds. If the width of that portion of the inter-connect substrate 1 is widened more, it comes to be disturbed more by winds. This is why the present invention avoids such modification as widening the portion that is to be disturbed by winds. The degradation of the overshooting waveform can thus be compensated while preventing the inter-connect substrate 1 from such disturbance by winds.

If the third section 103 is provided between the head element 2 and a position where the inter-connect substrate 1 is disposed closer to the head element 2 than a section crossed by or located in parallel to the spring part 50 of the suspension 5, the flexibility of the inter-connect substrate 1 is prevented from degradation due to the low impedance of the inter-connect substrate recording line 12 in that section. Consequently, the spring property of the suspension 5 required to secure the free positioning of the head element with respect to the magnetic disk is assured.

Next, a description will be made for how to reduce the ringing of the waveform of the current flowing into the recording head by matching the characteristic impedance $Z_0$ of the transmission line 10 between the recording signal output terminal of the recording/reproducing IC 3 and the inter-connect substrate recording line 11 in the first section 101 with the output resistance $R_s$ of the recording signal output terminal in the above recording/transmitting system. In that connection, it is difficult to lower the characteristic impedance $Z_0$ of the main FPC recording line 10, since the substrate of the main FPC 4 cannot be thinned any more to keep the strength. The output resistance $R_s$ of the recording and reproducing circuit IC 3 is generally 50Ω. If the output resistance $R_s$ is used as is, current reflection occurs due to the mismatching with the characteristic impedance $Z_0$, whereby the main FPC recording line 10 causes ringing. However, the output resistance of the recording signal output terminal can be increased easily with circuit modification. Consequently, if the output resistance $R_s$ is increased up to $R_s=Z_0$ without changing the characteristic impedance $Z_0$, it is possible to eliminate the current reflection between the recording/reproducing IC 3 and the main FPC recording line 10 and suppress the ringing to be caused by the repetitive return current in the recording/reproducing IC 3. In other words, the ringing to be caused by the main FPC recording line 10 is suppressed.

The above descriptions can be summarized as follows. The configuration of the wiring component in this first embodiment satisfies a relationship of $Z_1 > Z_2$ and sets the wiring distance between the inter-connect substrate recording line 12 and the inter-connect substrate reproducing line 21 wider than that between the inter-connect substrate recording line 11 and the inter-connect substrate reproducing line 21 so as to form the peak waveform to be used to compensate the degradation of the overshooting waveform with the multiple reflection to occur before and after the inter-connect substrate recording line 12. At the same time, it is possible to reduce the current coupling from the inter-connect substrate recording line 12 in which a large multiple reflection occurs to the inter-connect substrate reproducing line 21. The principle for forming the peak waveform will be described in detail later.

According to this embodiment, the peak waveform is formed with no change in the section 101 between a section not fixed to the arm of the inter-connect substrate 1, that is, an edge of the inter-connect substrate 1, which is the closest to the recording/reproducing IC 3, and the fixing position 52 a closest to the recording/reproducing IC 3 among the plurality of fixing positions at which the inter-connect substrate 1 is fixed to the suspension 5. Therefore, the problem that the inter-connect substrate 1 comes to flutter with winds can be prevented.

Furthermore, because the third section 103 begins at a position close to the head element 2 and is located at a tip of a place where the inter-connect substrate 1 crosses the spring part 50 of the suspension 5 almost in the center, the flexibility of the inter-connect substrate 1 at the spring part 50 is not degraded although the inter-connect substrate recording line 12 is increased in wiring width and spaced more from the inter-connect substrate reproducing line 21. Consequently, the spring property of the suspension 5 is maintained, whereby the free positioning property of the head element 2 is assured with respect to the magnetic disk 8 (FIG. 1).

Figure 3:
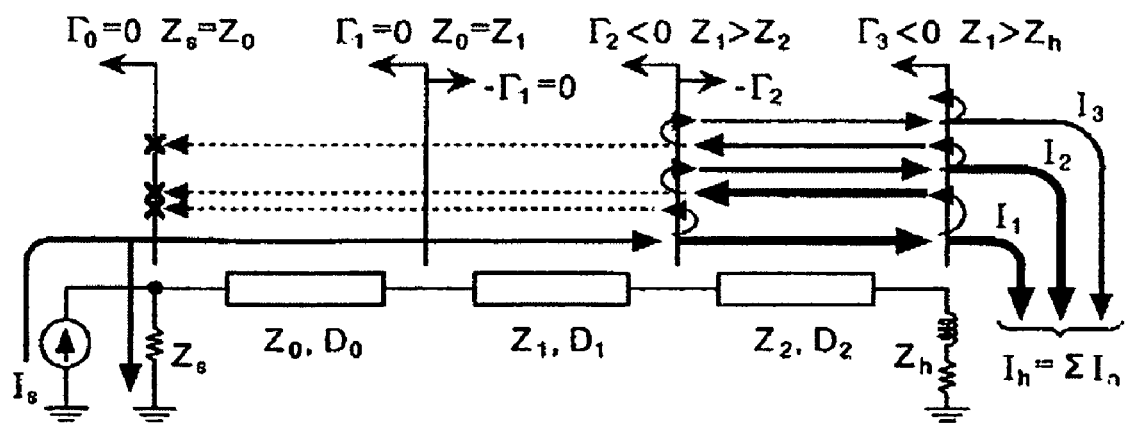
FIG. 3 illustrates a relationship between an equivalent circuit of a recording and transmitting system in the first embodiment and a return current.
Figure 4:
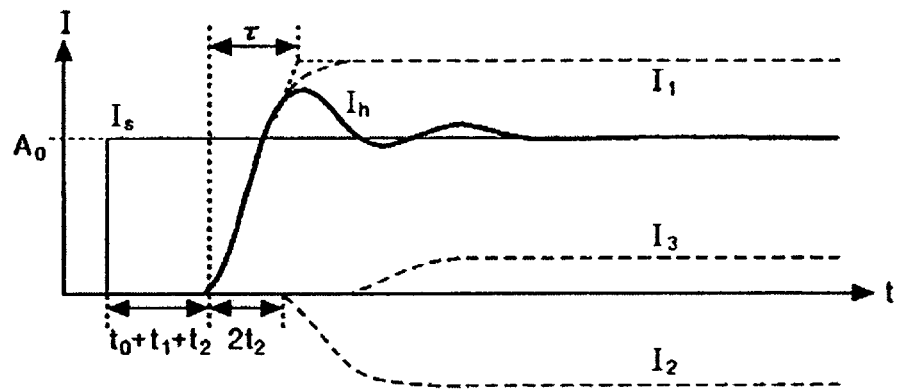
FIG. 4 illustrates a head current waveform formed with the recording and transmitting system in the first embodiment.

Next, a description will be made in detail for how a peak current waveform used to compensate degradation of the overshooting waveform is formed with reference to FIGS. 3 and 4. FIG. 3 shows a relationship between an equivalent circuit of a recording/transmission system in this embodiment and a return current and FIG. 4 shows a head current waveform formed at that time. The recording current $I_s$ output from the recording/reproducing IC 3 is divided by both of the output resistance $R_s$ and the characteristic impedance $Z_0$ of the main FPC recording line 10, whereby a current of $I_0=AI_s$ comes to flow in the main FPC recording line 10. At that time, $A=Z_0/(Z_0+R_s)$ is assumed. In this embodiment, the characteristic impedance $Z_1$ of the inter-connect substrate recording line 11 is equal to the characteristic impedance $Z_0$, so that the current $I_0$ flows into the inter-connect substrate recording line 11 with no reflection. In other words, the reflection coefficient $\Gamma_1$ becomes 0.

Because the characteristic impedance $Z_2$ of the inter-connect substrate recording line 12 is lower than the characteristic impedance $Z_1$, the current $I_0$, when flowing into the inter-connect substrate recording line 12, is reflected with the reflection coefficient $\Gamma_2$. Generally, when the current I flows into an element having impedance Zy from an element having impedance Zx, the reflection coefficient $\Gamma$ is represented as $\Gamma=(Zy-Zx)/(Zy+Zx)$ and the return current Ir is represented as $Ir=\Gamma I$ and the transmission current It is represented as $It=(1-\Gamma)I$. Consequently, $Z_1 > Z_2$ is assumed, so that the reflection coefficient $\Gamma_2$ takes a negative value and the transmission current takes a value larger than $I_0$. The current returns to the recording/reproducing IC 3 at that time. However, because $R_s = Z_0$ is assumed, the current is absorbed into $R_s$ with no reflection and the current never returns to the recording head.

The current flowing into the inter-connect substrate recording line 12 goes toward the recording head and is reflected with a reflection coefficient $\Gamma_3$ according to the recording head equivalent impedance $Z_h$. The equivalent impedance $Z_h$ consists of resistance $R_h$ that is smaller enough than that of the characteristic impedance $Z_2$ and inductor $L_h$ used to determine a rise time constant, so that the reflection coefficient $\Gamma_3$ takes a negative value because of the relationship between the characteristic impedance $Z_2$ and the resistance $R_h$. Consequently, the current flowing in the inter-connect substrate recording line 12 is multiplied by $1-\Gamma_3$ to be a current $I_1$ and flows into the recording head, while the current multiplied by $\Gamma_3$ is reflected and goes toward the recording/reproducing IC 3. Because the reflection coefficient $\Gamma_3$ is a negative value, this return current has a reversed polarity and is reflected with a reflection coefficient $-\Gamma_2$ from the inter-connect substrate recording line 11, then goes toward the recording head again. This current suffers reflection with equivalent impedance $Z_h$, then becomes a current $I_2$ and flows into the recording head. The current $I_2$ then returns as the current $I_3$ just like the current $I_1$.

As described above, multiple reflection currents generated before and after the inter-connect substrate recording line 12 flow into the recording head one after another, so that the last current $I_h$ flowing into the recording head becomes a combination of those currents. The first three currents $I_1$, $I_2$, and $I_3$ among those currents flowing into the recording head are formulated according to the above relationship as (1) to (3) as shown below.

Expression 1

$$I_1 = A(1-\Gamma_1)(1-\Gamma_2)(1-\Gamma_3)I_s > 0 \tag{1}$$

Expression 2

$$I_2 = -\Gamma_2\Gamma_3 I_1 < 0 \tag{2}$$

Expression 3

$$I_3 = -\Gamma_2\Gamma_3 I_2 > 0 \tag{3}$$

The head current waveforms shown in FIG. 4 are explanatory ones for showing the current $I_h$ and those currents on a time axis. The current $I_s$ output from the recording/reproducing IC 3 is simplified as a step waveform having an amplitude $A_0$. The first current $I_1$ to flow into the recording head appears at the recording head through the main FPC recording line 10 having a length of $D_0$, the inter-connect substrate recording line 11 having a length $D_1$, and the inter-connect substrate recording line 12 having a length $D_2$, so that it starts to rise with the delay of $t_0+t_1+t_2$ from the time at which the current $I_s$ is generated according to the length of each of the lines. The $t_n$ (n=0, 1, 2) denotes a time required for the current to flow in each of the lines and it is represented as follows by the expression (4).

Expression 4

$$t_n = D_n \frac{\sqrt{E_{eff}}}{c} \quad (4)$$

The $E_{eff}$ denotes the effective permittivity and the c denotes a light speed. Because the recording head has inductance components, the rise time of the recording head is slowed with a time constant. The time constant X for the step waveform is represented as follows by the expression (5).

Expression 5

$$\tau = \frac{L_h}{R_s + R_h} \quad (5)$$

After that, the current $I_2$ reflects from the recording head and between the inter-connect substrate recording line 11 and the inter-connect substrate recording line 12, then flows into the recording head again, so that it starts to rise with the delay of just by the double length of $D_2$ from the current $I_1$, that is, by a time of $2\times t_2$. Actually, however, instantaneous current reflection is suppressed by the influence of the inductance components of the recording head, so that the delay takes a value that is a little over $2\times t_2$. Because the waveform of the current $I_1$ is affected by the inductor $L_h$ again, the rise time becomes longer than $\tau$. Furthermore, because the current $I_3$ comes to have a waveform of the current $I_2$ that has made a multiple reflection, it delays further than the current $I_2$ and the rise time becomes longer than that of the current $I_2$. As shown in the relationships in the expressions (1) to (3), the current $I_1$ becomes larger than the current $I_s$ while the current $I_2$ becomes smaller than the current $I_1$ and negative. The current $I_3$ becomes smaller than the current $I_2$ and positive. Thus, the $I_h$ that is a combination of those currents comes to have a sharp peak pattern, although the current $I_s$ is a step waveform. The longer the time for the current $I_2$ to reach the recording head becomes, the wider the peak becomes in shape, thus the shorter the inter-connect substrate recording line 12 becomes, the narrower the peak becomes in shape. However, if the current $I_2$ reaches the recording head before the current $I_1$ rises, the peak goes low. The peak can be increased in height by lowering the characteristic impedance $Z_2$ of the inter-connect substrate recording line 12. This is because the rate at which the reflection coefficient $\Gamma_2$ increases when the characteristic impedance $Z_2$ goes low is larger than the rate at which the reflection coefficient $\Gamma_3$ becomes small if the characteristic impedance values $Z_0$ and $Z_1$ are about 100Ω and the characteristic impedance $Z_2$ is about a few tens of ohms while the resistance $R_h$ is about a few ohms just like in this embodiment. As a result, each of the current values $I_1$, $I_2$, and $I_3$ increases and the peak becomes higher.

While the recording current output waveform of the recording/reproducing IC 3 is a step waveform in this embodiment, the waveform may be a waveform having a limited rise time and overshooting. Even in that case, the recording/transmitting system provided in the wiring component of the present invention can form the peak waveform. While it has been required conventionally to output a recording current signal that rises sharply and has narrow and high overshooting by improving the high frequency characteristic of the recording/reproducing IC 3 so as to enable high-speed data recording, the recording/transmitting system of the present invention, as described in this embodiment, can form a peak waveform even from a step waveform. Consequently, even when the high frequency characteristic of the recording/reproducing IC 3 cannot be improved, the performance of the recording/reproducing IC 3 can be compensated.

Second Embodiment

In this second embodiment of the present invention, the inter-connect substrate recording line 11 increases in width slightly while the structure in the first embodiment is employed almost as is to set the characteristic impedance $Z_1$ at 87Ω. As to be described later, in the first embodiment, if the data rate is 1 GBps, some ringing occurs due to the multiple reflection just after a peak. The ringing in such a case is not recognized as a trouble in general recording media. In some recording media, however, such ringing is required to be suppressed. This second embodiment corresponds to such a case.

If the characteristic impedance $Z_1$ is set at 87Ω, a relationship $R_s=Z_0>Z_1>Z_2>R_h$ is satisfied, since the output resistance of the recording/reproducing IC 3 becomes $R_s$=100Ω, the characteristic impedance of the main FPC recording line 10 becomes $Z_0$=100Ω, the characteristic impedance of the inter-connect substrate recording line 11 becomes $Z_1$=87Ω, the characteristic impedance of the inter-connect substrate recording line 12 becomes $Z_2$=30Ω, and the recording head resistance component becomes $R_h$=5Ω.

According to the above relationship, the return current of the recording output current of the recording/reproducing IC 3, which occurs newly between the characteristic impedance $Z_0$ and the characteristic impedance $Z_1$, is combined with the re-return current of the return current from the recording head to suppress the ringing that occurs when the peak current waveform is formed due to the multiple reflection between the characteristic impedance $Z_1$ and the recording head resistance $R_h$. In other words, the ringing that occurs when the peak current waveform is formed just like in the first embodiment is suppressed.

Figure 5:
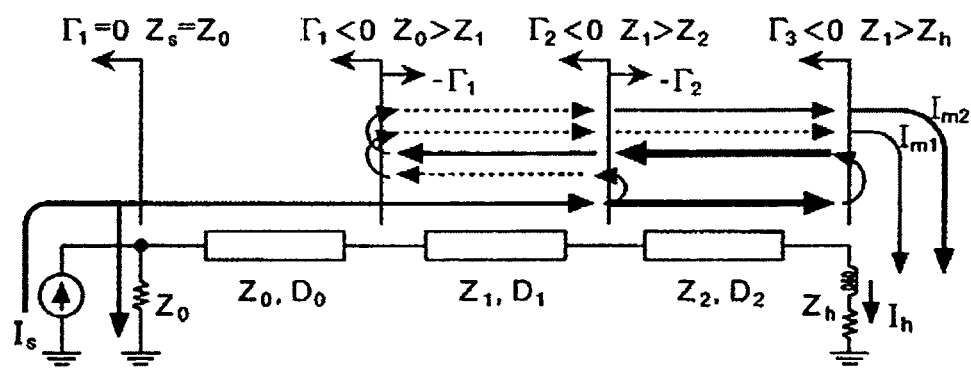
FIG. 5 illustrates a relationship between an equivalent circuit of a recording and transmitting system in the second embodiment of the present invention and a return current.
Figure 6:
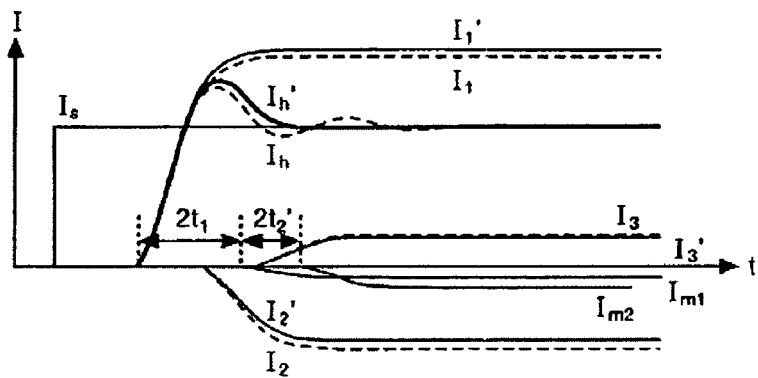
FIG. 6 illustrates a head current waveform formed by a recording and transmitting system in the second embodiment.

Next, the principle for suppressing the ringing will be described in detail with reference to FIGS. 5 and 6. FIG. 5 shows a relationship between the equivalent circuit of the recording/transmitting system and a return current in this second embodiment. FIG. 6 shows a head current waveform to be formed at that time. In this second embodiment, the characteristic impedance $Z_1$ is set lower than the characteristic impedance $Z_0$ so that the reflection coefficient $\Gamma_1$ comes to have a negative value. Consequently, the current that returns from the recording head and goes to the recording/reproducing IC 3 returns again between the inter-connect substrate recording line 11 and the main FPC recording line 10, then goes to the recording head. For example, the current that returns between the inter-connect substrate recording line 11 and the inter-connect substrate recording line 12 and goes toward the recording/reproducing IC 3 returns again at a reflection coefficient $-\Gamma_1$ between the inter-connect substrate recording line 11 and the main FPC recording line 10, then goes toward the recording head to flow into the recording head as a current $I_{m1}$. The current that returns from the recording head flows into the inter-connect substrate recording line 11 from the inter-connect substrate recording line 12, then returns again between the inter-connect substrate recording line 11 and the main FPC recording line 10, then goes toward the recording head to flow into the recording head as a current $I_{m2}$. Both of $I_{m1}$ and $I_{m2}$ are represented as follows in the expressions (6) and (7).

Expression 6

$$I_{m1} = -\Gamma_1 \Gamma_2 I_1 < 0 \quad (6)$$

Expression 7

$$I_{m2} = -\Gamma_1(1+\Gamma_2)(1-\Gamma_2)\Gamma_3 I_1 < 0 \quad (7)$$

Here, the currents $I_1$ to $I_3$ are represented in the expressions (1) to (3).

When compared with the currents $I_1$ to $I_3$ at $Z_0=Z_1$ in the first embodiment, the currents $I_1'$ to $I_3'$ at $Z_0>Z_1$ in this second embodiment becomes as follows: the $I_1'$ increases, the $I_2'$ decreases, and the $I_3'$ decreases slightly. A waveform of a current that is a combination of those currents $I_1'$ to $I_3'$, when compared with the current $I_h$ in the first embodiment, becomes as follows: the first peak goes higher, the dip due to the current $I_2'$ goes small, and the second peak due to the current $I_3'$ remains. However, each of the currents $I_{m1}$ and $I_{m2}$ has a polarity reversed from that of the current $I_3'$ and rises at a time close to that of the current $I_3'$. The second peak due to the current $I_3'$ can thus be negated. This is why the current $I_h'$ that is a combination of all those currents comes to have an ideal waveform with no ringing, although it has a sharp peak pattern.

While the section having characteristic impedance $Z_0$ is set only in the main FPC recording line 10 in this second embodiment, the section may be extended into the inter-connect substrate recording line 11 connected to the main FPC recording line 10. On the contrary, the section having characteristic impedance $Z_1$ may be extended into the main FPC recording line 10. Because how much ringing is to be suppressed efficiently can be adjusted with both of the $Z_1$ section length and the $Z_1$ value, such a configuration can extend the adjustment range of ringing.

Next, how the present invention is effective to improve the overshooting waveform will be described with reference to FIGS. 7 through 10. FIGS. 7 through 10 are analysis results obtained with use of a high frequency circuit simulator that shows waveforms of the recording current $I_s$ output from the recording/reproducing IC 3 and the recording head current $I_h$ with respect to the current $I_s$. In all of FIGS. 7 through 10, the dotted line denotes the current $I_s$ while the solid line denotes the current $I_h$. The (a) side shows analysis results at a date rate of 1 GBps and the (b) side shows analysis results at a date rate of 2 GBps. The line transmission loss is 25 dB/m, the effective permittivity is 2, and the recording head equivalent impedance is $L_h=5$ nH and $R_h=40$.

Figure 7:
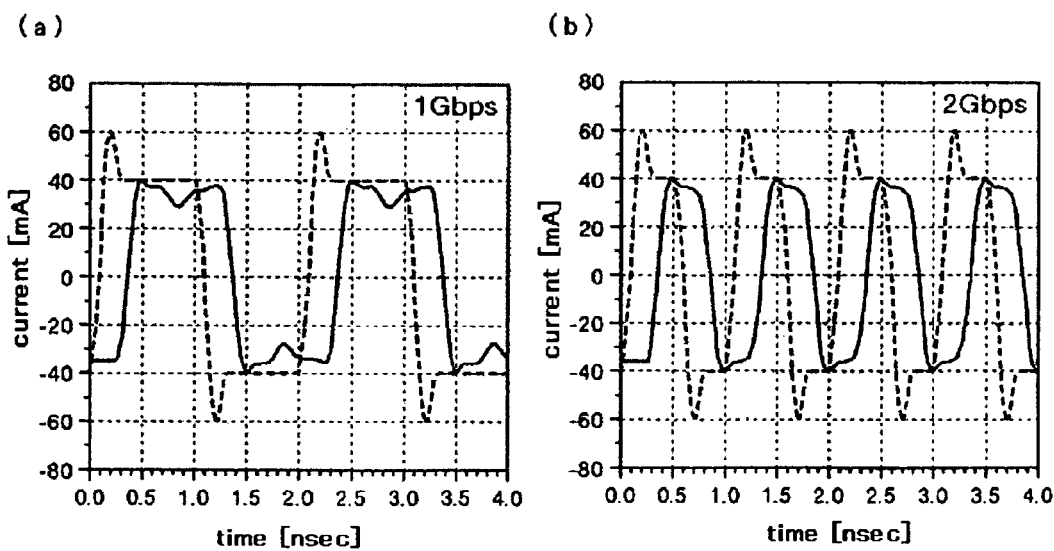
FIG. 7 illustrates graphs for denoting analysis results of a head current waveform formed by a conventional recording and transmitting system.

FIG. 7 shows analysis results obtained from a conventional recording/transmitting system ($Z_s=70\Omega$, $Z_0=100\Omega$, $Z_1=70\Omega$, $D_0=10$ mm, and $D_1=36$ mm). Because the main FPC recording line 10 is 10 mm in length, if the data rate is low enough, no abnormality occurs in the head current even when the characteristic impedance in that portion is high. If the data rate is in a GBps order like this analysis result, however, abnormality occurs in the head current. For example, if the data rate is 1 GBps, ringing is observed in the current $I_h$. If the data rate is 2 GBps, overshooting is hardly recognized.

Figure 8:
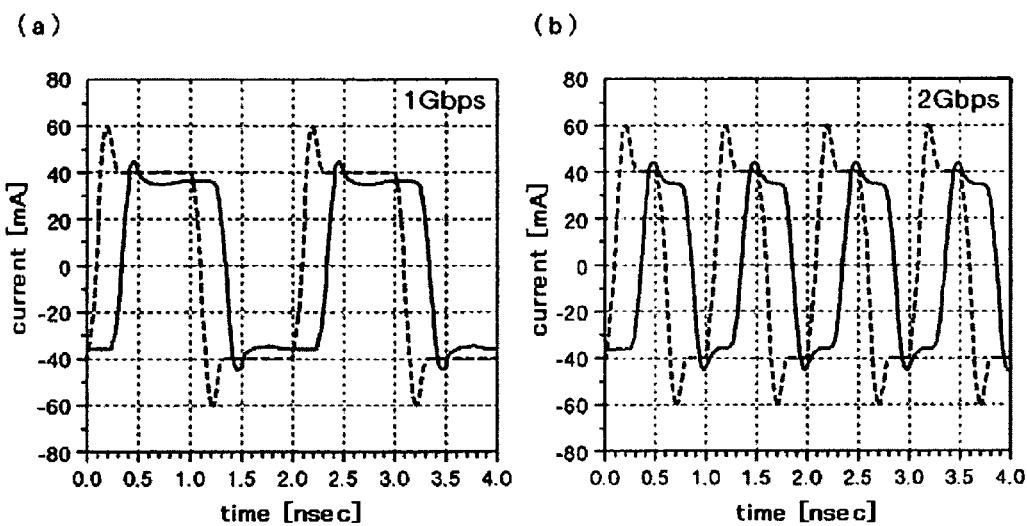
FIG. 8 illustrates other graphs for denoting analysis results of a head current waveform formed by the conventional recording and transmitting system.

FIG. 8 shows analysis results of a conventional recording/transmitting system ($Z_s=100\Omega$, $Z_0=100\Omega$, $Z_1=100\Omega$, $D_0=10$ mm, and $D_1=36$ mm) when impedance values in all the recording lines are matched. Because the impedance values match in all the recording lines, no ringing occurs in the current $I_h$ at a data rate of 1 GBps, but the overshooting goes low due to a transmission loss at both of the data rates 1 GBps and 2 GBps.

Figure 9:
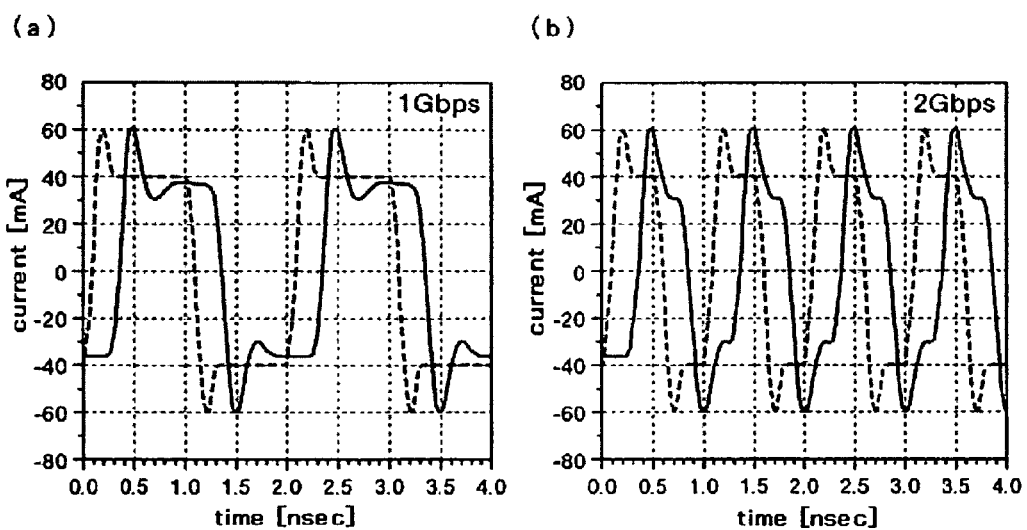
FIG. 9 illustrates graphs for denoting analysis results of a head current waveform formed by a recording and transmitting system in the first embodiment.

FIG. 9 shows analysis results of a recording/transmitting system ($Z_s=100\ \Omega$, $Z_0=100\Omega$, $Z_1=100\Omega$, $Z_2=30\Omega$, $D_0=10$ mm, $D_1=31$ mm, and $D_2=5$ mm) in the first embodiment of the present invention. As shown in FIG. 9, at both of the data rates of 1 GBps and 2 GBps, the same level peak is formed in the currents $I_h$ and $I_s$. As shown in the analysis result of 1 GBps, ringing occurs in the current due to the multiple reflection that occurs just after the peak.

Figure 10:
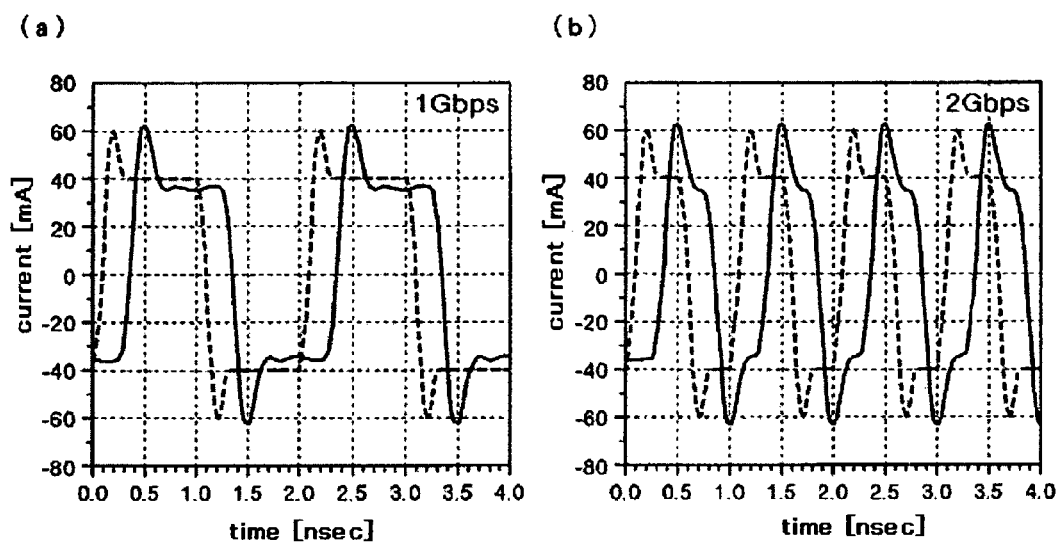
FIG. 10 illustrates graphs for denoting analysis results of a head current waveform formed by a recording and transmitting system in the second embodiment.

FIG. 10 shows analysis results of a recording/transmitting system ($Z_s=100\ \Omega$, $Z_0=100\Omega$, $Z_1=87\Omega$, $Z_2=30\Omega$, $D_0=10$ mm, $D_1=31$ mm, and $D_2=5$ mm) in the second embodiment of the present invention. At both of the data rates of 1 GBps and 2 GBps, the same level peak as that of the current $I_s$ is formed in the current $I_h$ just like in the first embodiment. As shown in the analysis result of 1 GBps, ringing that occurs in the first embodiment is not recognized.

Figure 11:
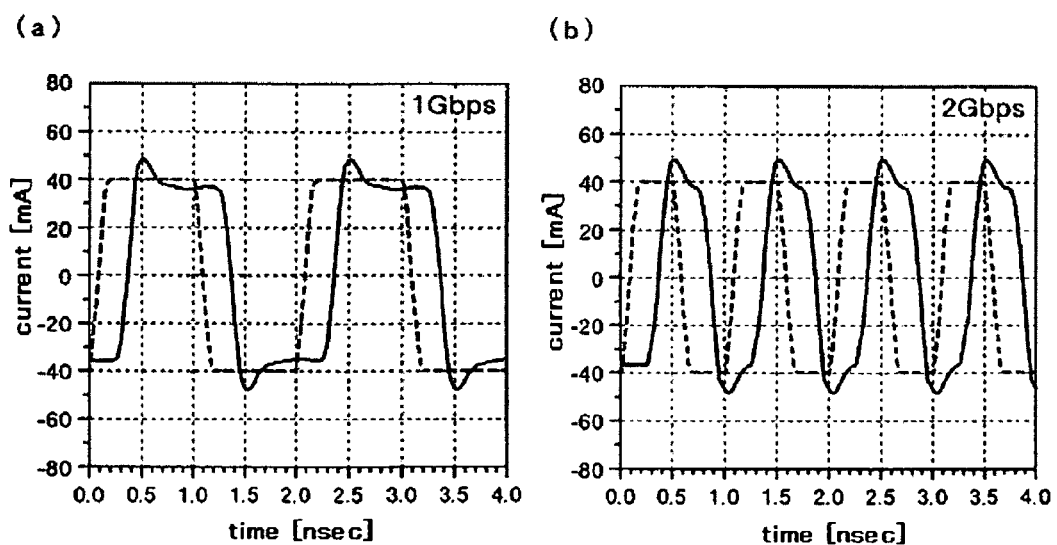
FIG. 11 illustrates other graphs for denoting analysis results of a head current waveform formed by a recording and transmitting system in the second embodiment.
Figure 12:
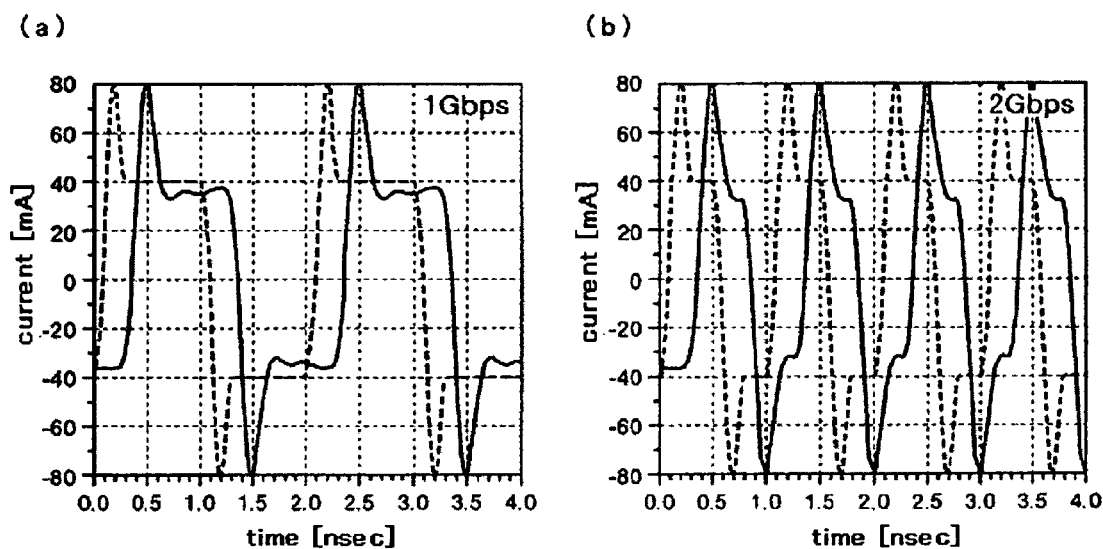
FIG. 12 illustrates still other graphs for denoting analysis results of a head current waveform formed by a recording and transmitting system in the second embodiment.

FIG. 11 shows analysis results of the waveforms of the recording current $I_h$ formed by the recording/transmitting system in the second embodiment of the present invention when no overshooting is recognized in the recording current $I_s$ output from the recording/reproducing IC 3. FIG. 12 shows analysis results of the waveforms of the recording current $I_h$ formed by the recording/transmitting system in the second embodiment of the present invention when large overshooting is recognized in the recording current $I_s$ output from the recording/reproducing IC 3. In both FIGS. 11 and 12, the dotted line denotes the current $I_s$ while the solid line denotes the current $I_h$. The (a) side shows an analysis result at a data rate of 1 GBps while the (b) side shows an analysis result at a data rate of 2 GBps.

Conventionally, both height and width of overshooting in the recording current $I_s$ output from the recording/reproducing IC 3 has been adjusted to enable the recording head to generate an optimal magnetic field waveform. FIGS. 11 and 12 show a case in which no overshooting is added in the recording current I, output from the recording/reproducing IC 3 and a case in which overshooting larger than that shown in FIG. 10 is added in an embodiment of the present invention. According to the height of the overshooting, the peak current is found to be varied in height. Consequently, even the present invention can generate an optimal magnetic field waveform from the recording head by adjusting overshooting in the recording current $I_s$ output from the recording/reproducing IC 3.

As to be understood from the above results, the recording/transmitting system of the present invention can compensate the overshooting waveform to be lost by a transmission loss by generating a new peak waveform. This is why high-speed recording is enabled for the magnetic disk drive using the recording current having this waveform.

Third Embodiment

Figure 13:
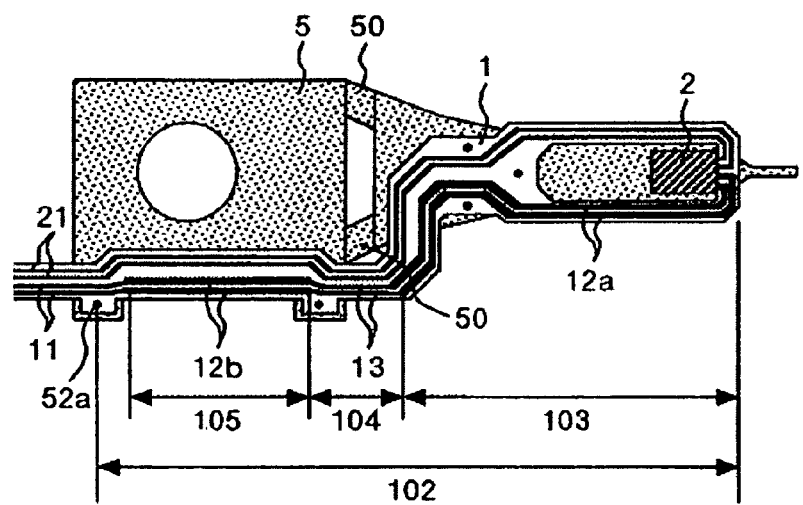
FIG. 13 is a diagram of a wiring component in the third embodiment of the present invention.

FIG. 13 shows the third embodiment of the wiring component of the present invention. In this third embodiment, an inter-connect substrate 1 is disposed aside from a spring part 50, not in the center of the spring part 50 in the second section 102 and an inter-connect substrate recording line 12 is extended up to a fixing position 52a closest to the recording/reproducing IC 3 among plural fixing positions at which the substrate 1 is to be fixed to a suspension 5 except for one side of the spring part 50. In other words, the inter-connect substrate recording line 12 provided in the second section 102, which is located between the fixing point 52a and the head element, is divided into two parts and disposed except for the fourth section 104 in parallel to the direction in which the spring part 50 of the suspension 5 goes to the head 2 from the arm fixing hole.

An inter-connect substrate recording line 12b provided in the fifth section 105 closer to the recording and reproducing circuit IC among the sections divided by the fourth section 104 is 45 Ω in characteristic impedance and 4 mm in length. An inter-connect substrate recording line 12a provided in the third section 103 closer to the head 2 is 45Ω in characteristic impedance and 8 mm in length. An inter-connect substrate recording line 13 in the fourth section 104 is 100Ω in characteristic impedance and 2 mm in length. An inter-connect substrate recording line 11 is 100Ω in characteristic impedance and 22 mm in length. The space between the inter-connect substrate recording line and the inter-connect substrate reproducing line 21 is 0.3 mm in both of the first section 101 and the fourth section 104 while the space in the fifth section 105 and the third section 103 is over 0.5 mm except for the portion for connecting the head element 2 to those wirings.

According to this third embodiment, the inter-connect substrate 1 is free of a problem of flutter to be caused by winds and the flexibility of the spring part 50 of the suspension 5 is kept while the inter-connect substrate recording line 12 is extended to the maximum. In that connection, the time for a signal to pass a length of 2 mm of the third section 103 is about 9 ps and the time almost does not affect at all the waveform of a high-speed data signal which has about 100 ps of rise time. However, because the inter-connect substrate recording line 12 is extended so long, the characteristic impedance of the inter-connect substrate recording line 12 required to obtain a satisfactory peak waveform can be set higher than that in the first embodiment. Consequently, the width of the inter-connect substrate recording line 12 may be set narrower than that in the first embodiment, whereby the flexibility at one side of the inter-connect substrate 1 that is closer to the head element 2 is improved and the positioning arbitrariness of the head 2 has been kept.

Fourth Embodiment

Figure 14:
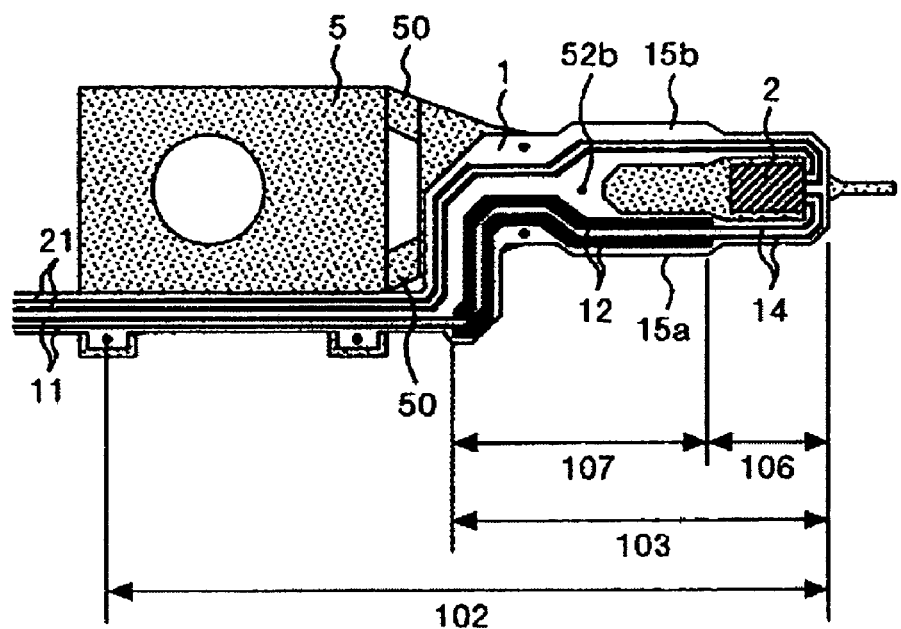
FIG. 14 is a diagram of a wiring component in the fourth embodiment of the present invention.

FIG. 14 shows the fourth embodiment of the wiring component of the present invention. In this fourth embodiment, an inter-connect substrate 1 is disposed aside from a spring part 50, not in the center of the spring part 50, in the second section 102. The third section 103 provided in the second section 102 is divided into the seventh section 107 provided between a position closer to the head element 2 than the section in which the inter-connect substrate 1 is disposed in parallel to the direction in which the spring part 50 of the suspension 5 goes towards the head 2 from an arm fixing position and the head element 2, as well as the sixth section 106 provided closest to the head element 2.

The inter-connect substrate recording line 12 provided in the seventh section 107 is 30Ω in characteristic impedance and 5 mm in length while the inter-connect substrate recording line 14 provided in the sixth section 106 is 100Ω in characteristic impedance and 2 mm in length. On the other hand, the inter-connect substrate recording line 11 is 100Ω in characteristic impedance and 29 mm in length. The space between each inter-connect substrate recording line and the inter-connect substrate reproducing line 21 is 0.3 mm in the first section 101 and the second section 102 when the third section 103 is excluded from them and over 0.5 mm in the third section 103 except for the portion for connecting the head element 2 to those wirings.

In this fourth embodiment, the positioning arbitrariness of the head element 2 is vastly improved due to the existence of the sixth section 106 having high characteristic impedance and narrow wiring width. The 2 mm long sixth section 106 does not affect the forming of the peak waveform almost at all just like the length of the fourth section 104 in the third embodiment. Furthermore, in this fourth embodiment, a position 15b is provided at the inter-connect substrate reproducing line 21 side with respect to the position 15a where the inter-connect substrate 1 increases in width in accordance with the width of the inter-connect substrate recording line 12 set wider in accordance with the lowered impedance between the fixing position 52b closest to the head element 2 among the plurality of fixing positions where the inter-connect substrate 1 is fixed to the suspension 5 and the head element 2. The position 15b is provided symmetrically about the position 15a and the center line of the head element 2 in the longitudinal direction. Consequently, the inter-connect substrate 1 comes to be disposed symmetrically about the center line of the head element in the longitudinal direction. Because of the symmetrical disposition and the presence of the positions 15a and 15b, the flexibility of the inter-connect substrate 1 in the section having an increased width becomes almost equal to the center line of the head element 2 in the longitudinal direction, that is, because the inter-connect substrate 1 just under the inter-connect substrate recording line 12 in this section and the inter-connect substrate 1 just under the inter-connect substrate reproducing line 21 are formed in the same shape, the flexibility becomes almost equal between both inter-connect substrates 1 and the symmetrical positioning arbitrariness of the head element with respect to the magnetic disk are assured. Even in the first to third embodiments in which none of the wider positions 15a and 15b are provided, the inter-connect substrate 1 is disposed symmetrically about the center line of the head element 2 in the longitudinal direction.

Fifth Embodiment

This fifth embodiment of the magnetic disk drive of the present invention is realized by applying the wiring component in any of the first to fourth embodiments to the magnetic disk drive shown in FIG. 1. The inter-connect substrate 1, the head element 2, the recording and reproducing circuit IC 3, the main FPC 4, and the suspension 5 shown in FIG. 1 are all the same as those of the wiring component in any of the first to fourth embodiments.

Figure 15:
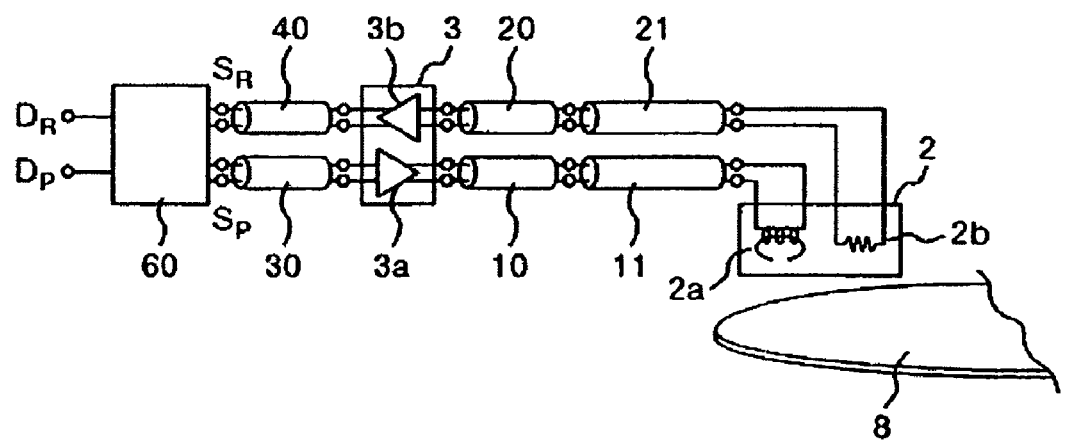
FIG. 15 is a circuit diagram of a magnetic disk drive in the fifth embodiment of the present invention.

FIG. 15 shows a signal circuit used in the magnetic disk drive in this fifth embodiment. In FIG. 15, reference numerals and symbols are defined as follows; 2a denotes a recording head of a head element 2, 2b denotes a reproducing head of the head element 2, 3a denotes a recording signal driver of the recording/reproducing IC 3, 3b denotes a reproducing signal amplifier of the recording/reproducing IC 3, and 60 denotes a signal processor LSI.

A recording signal $S_R$ generated from recording data $D_R$ by the signal processor LSI 60 is transferred to the recording/reproducing IC 3 through a recording line provided at the main FPC 4. The recording signal waveform is shaped by the recording signal driver 3a of the main FPC 4, then the signal is transferred to the recording head 2a of the head element through the main FPC recording line 10 provided on the main FPC 4 and the inter-connect substrate recording line 11 provided on the inter-connect substrate 1 respectively. The recording signal is transformed into a magnetic field by the recording head 2a represented by a thin film inductor and recorded on a magnetic disk 8.

After that, in a reproduction process, the data recorded on the magnetic disk 8 appears as resistance changes of the reproducing head 2b represented by the gigantic magneto resistive head provided at the head element 2. This resistance changes are transformed into voltage change signals, which are then amplified by the reproducing signal amplifier 3b of the recording/reproducing IC 3 through the inter-connect substrate reproducing line 21 provided on the inter-connect substrate 1 and the main FPC reproducing line 20 provided on the main FPC 4 respectively. The reproducing signal $S_P$ amplified by the reproducing signal amplifier 3b and output is transferred to the signal processor LSI 60 through the reproducing line 40 provided on the main FPC 4 and reproduced data $D_P$ is output from the signal processor LSI 60.

Figure 16:
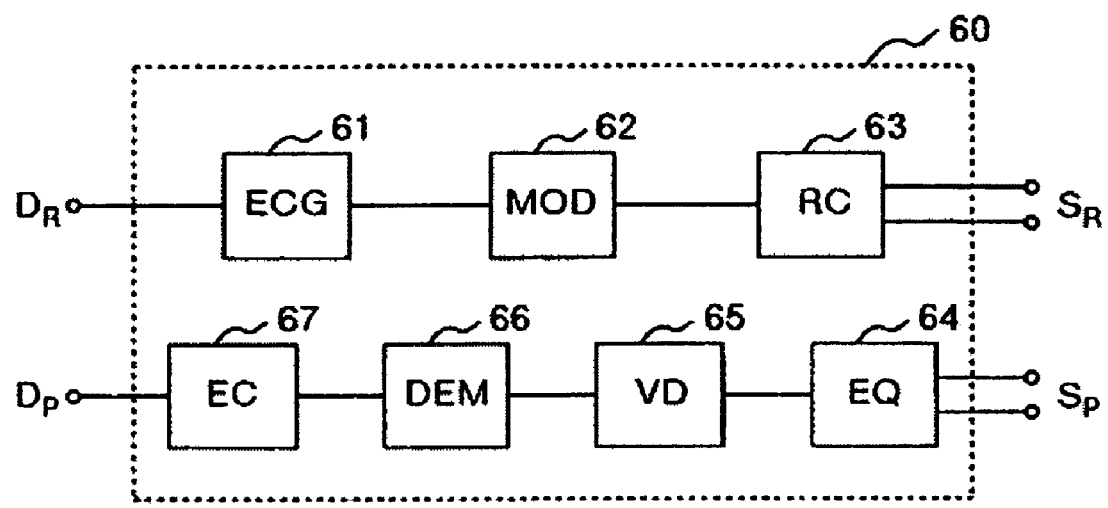
FIG. 16 is a circuit diagram of a signal processor LSI in the fifth embodiment.

FIG. 16 shows a circuit diagram of the signal processor LSI 60. The recording system of the signal processor LSI 60 is configured by an error code generation circuit (ECG) 61 for adding an error correction code to each recording data $D_R$, a modulation circuit (MOD) 62 for transforming a data string having an added error correction code into a data string having a lowered error rate, and a recording compensation circuit (RC) for compensating a recording timing deviation for an output signal of the modulation circuit 62, adjusting the recording signal waveform, then outputting the recording signal $S_R$.

The reproducing system of the signal processor LSI 60 is configured by a waveform equalizing circuit (EQ) 64 for equalizing the waveform for the reproducing signal $S_p$, a Viterbi decoder (VD) 65 for decoding the output signal of the waveform equalizing circuit 64 for enabling error correction with use of a Viterbi algorithm, a demodulation circuit (DEM) 66 for transforming the Viterbi decoded output signal of the Viterbi decoder 65 into a data string, and an error correction circuit (EC) 67 for making error correction for the data string transformed output signal of the demodulation circuit 66 with use of an error code, then outputting reproducing data $D_p$.

In the magnetic disk drive in this embodiment, overshooting required for high-speed data recording is generated without any of crosstalk between lines, influence of winds in the drive body, and adverse influence on the spring property of the suspension, thereby realizing high-speed and highly reliable magnetic recording/reproducing with use of a wiring component capable of high-speed data recording on a magnetic recording medium.

While a recording/reproducing system for a magnetic disk drive has been described, the present invention can also apply to any transmitting systems to be employed for high-speed data signals, particularly to any transmitting systems required to reduce the waveform rise time with use of overshooting. Such transmitting systems, for example, are magnetic disk drives, as well as magnetic recording drives such as optical magnetic disk drives, magnetic tape units, etc. While a differential transmission line has been an object line, the same effect is obtained even from a general unbalanced transmission line such as a micro-strip line, etc.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A wiring component, including:
   a head element for recording/reproducing information on/from a recording medium;
   a recording and reproducing circuit configured to supply a signal to be recorded to said head element and amplify a signal to be reproduced by said head element;
   a first line provided at said recording and reproducing circuit side and used to connect said recording and reproducing circuit to said head element; and
   a second line provided at said head element side and used to connect said recording and reproducing circuit to said head element,
   wherein a first recording line of said second line, which transmits said signal to be recorded, is divided into a first section for said recording and reproducing circuit side and a second section for said head element side,
   wherein said second section includes a portion of said first recording line, which has characteristic impedance lower than characteristic impedance of said first recording line of said first section, and another portion of said first recording line, which has characteristic of impedance matching with characteristic impedance of said first recording line of said first section,
   wherein, when said second line is formed on a substrate and said substrate is fixed to a suspension on which said head element is to be mounted, said first section is provided between said first line and a fixing position for fixing said substrate to said suspension and closest to said recording and reproducing circuit, and
   wherein said second section is provided between said fixing position and said head element.

2. The wiring component according to claim 1, wherein the width of said portion of said first recording line having said lower characteristic impedance is wider than the width of said first recording line of said first section.

3. The wiring component according to claim 1, wherein the output resistance of said recording and reproducing circuit matches with the characteristic impedance of a second recording line of said first line, which transmits said recording signal, and the characteristic impedance of said second recording line matches with characteristic impedance of said first recording line of said first section.

4. The wiring component according to claim 1, wherein the output resistance of said recording and reproducing circuit matches with the characteristic impedance of a second recording line of said first line, which transmits said recording signal while the characteristic impedance of said first recording line of said first section is lower than characteristic impedance of said second recording line.

5. The wiring component according to claim 1, wherein said portion of said first recording line having said lower characteristic impedance is formed between said head element and a position away from a spring part of said suspension and close to said head element.

6. The wiring component according to claim 1, wherein, when said second section is divided into a fourth section disposed in parallel to said spring part of said suspension, a third section provided closer to said head element than said fourth section, and a fifth section provided closer to said fixing portion than said fourth section, said first recording line portion having said lower characteristic impedance is formed between said third section and said fifth section.

7. The wiring component according to claim 1, wherein, when said second section is divided into a fourth section provided in parallel to said spring part of said suspension, a third section provided closer to said head element than said fourth section, and a fifth section provided closer to said fixing portion than said fourth section while said third section is divided into a sixth section provided at said head element side and a seventh section provided closer to said fourth section, said first recording line portion having said lower characteristic impedance is formed in said seventh section.

8. The wiring component according to claim 1,
wherein said substrate is disposed almost symmetrically about the center line of said head element in the longitudinal direction between a different fixing position for fixing said substrate to said suspension and closest to said head element and said head element.

9. The wiring component according to claim 1,
wherein said second line includes a reproducing line disposed in parallel to said first recording line and used to transmit a signal to be reproduced by said head element, and
wherein the wiring distance between said reproducing line disposed in parallel to said portion of said first recording line having said lower characteristic impedance and said portion of said first recording line having said lower characteristic impedance is longer than the wiring distance between said reproducing line disposed in parallel to said first recording line of said first section and said first recording line of said first section.

10. A magnetic recording drive, including:
a recording medium for recording data;
a wiring component configured to record/reproduce data on/from said recording medium;
a suspension configured to fix said wiring component;
an arm configured to drive said suspension; and
a signal processor configured to process a signal to be recorded on said wiring component and process a reproducing signal received from said wiring component,
wherein said wiring component includes:
a head element for recording/reproducing data on/from said recording medium;
a recording and reproducing circuit configured to supply a signal to be recorded to said head element and amplify a signal to be reproduced by said head element;
a first line provided at said recording and reproducing circuit side and used to connect said recording and reproducing circuit to said head element; and
a second line provided at said head element side and used to connect said recording and reproducing circuit to said head element,
wherein a first recording line of said second line, which transmits said signal to be recorded, is divided into a first section for said recording and reproducing circuit side and a second section for said head element side,
wherein said second section includes a portion of said first recording line, which has characteristic impedance lower than characteristic impedance of said first recording line of said first section, and another portion of said first recording line, which has characteristic impedance matching with characteristic impedance of said first recording line of said first section, and
wherein, when said second line is formed on a substrate and said substrate is fixed to said suspension on which said head element is to be mounted, said first section is provided between a fixing position for fixing said substrate to said suspension and closest to said recording and reproducing circuit and said first line while said second is provided between said fixing position and said head element.

11. The magnetic recording drive according to claim 10,
wherein the width of said portion of said first recording line having said lower characteristic impedance is wider than the width of said first recording line of said first section.

12. The magnetic recording drive according to claim 10,
wherein the output resistance of said recording and reproducing circuit matches with the characteristic impedance of a second recording line of said first line, which transmits said recording signal while the characteristic impedance of said second recording line matches with characteristic impedance of said recording line of said first section.

13. The magnetic recording drive according to claim 10,
wherein the output resistance of said recording and reproducing circuit matches with the characteristic impedance of a second recording line of said first line, which transmits said recording signal while the characteristic impedance of said first recording line of said first section is lower than characteristic impedance of said second recording line.

14. The magnetic recording drive according to claim 10,
wherein said portion of said first recording line having said lower characteristic impedance is formed between a position away from a spring part of said suspension and close to said head element.

15. The magnetic recording drive according to claim 10,
wherein, when said second section is divided into a fourth section disposed in parallel to said spring part of said suspension, a third section provided closer to said head element than said fourth section, and a fifth section provided closer to said fixing portion than said fourth section, said first recording line portion having said lower characteristic impedance is formed between said third section and said fifth section.

16. The magnetic recording drive according to claim 10,
wherein, when said second section is divided into a fourth section provided in parallel to said spring part of said suspension, a third section provided closer to said head element than said fourth section, and a fifth section provided closer to said fixing portion than said fourth section while said third section is divided into a sixth section provided at said head element side and a seventh section provided closer to said fourth section, said first recording line portion having said lower characteristic impedance is formed in said seventh section.

17. The magnetic recording drive according to claim 10,
wherein said substrate is disposed almost symmetrically about the center line of said head element in the longitudinal direction between a different fixing position for fixing said substrate to said suspension and closest to said head element and said head element.

18. The magnetic recording drive according to claim 10,
wherein said second line includes a reproducing line disposed in parallel to said first recording line and used to transmit a signal to be reproduced by said head element, and
wherein the wiring distance between said reproducing line disposed in parallel to said portion of said first recording line having said lower characteristic impedance and said portion of said first recording line having said lower characteristic impedance is longer than the wiring distance between said reproducing line disposed in parallel to said first recording line of said first section and said first recording line of said first section.

* * * * *

UNITED STATES PATENT AND TRADEMARK OFFICE
CERTIFICATE OF CORRECTION

PATENT NO. : 7,460,338 B2
APPLICATION NO. : 11/341240
DATED : December 2, 2008
INVENTOR(S) : Okabe It is certified that error appears in the above-identified patent and that said Letters Patent is hereby corrected as shown below:

Claim 1, column 18, line 18, please delete "characteristic off impedance" and insert --characteristic impedance--

Claim 6, column 18, line 56, please delete "said spring part" and insert --a spring part--

Claim 7, column 18, line 65, please delete "said spring part" and insert --a spring part--

Claim 10, column 19, line 64, please delete "second is" and insert --second section is--

Claim 15, column 20, line 28, please delete "said spring part" and insert --a spring part--

Claim 16, column 20, line 37, please delete "said spring part" and insert --a spring part--

Signed and Sealed this

Seventeenth Day of February, 2009

JOHN DOLL
*Acting Director of the United States Patent and Trademark Office*